Figure 4:
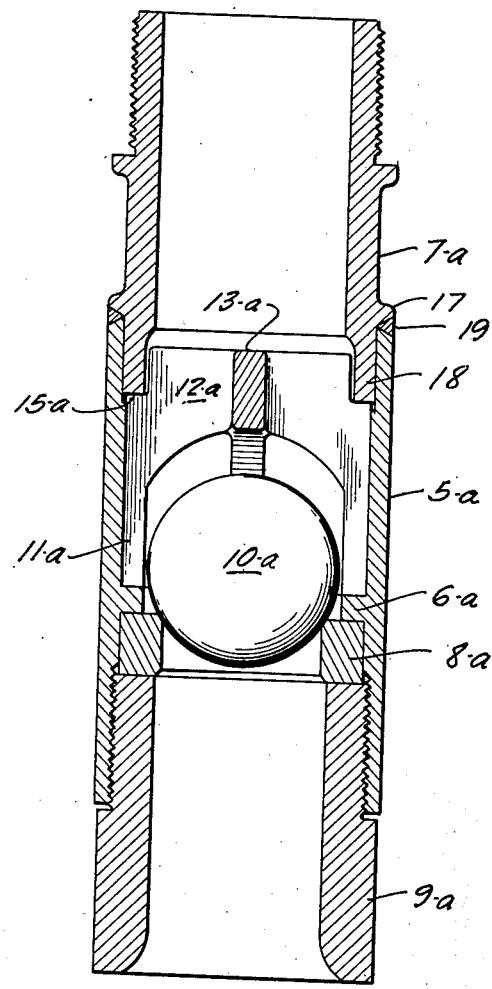

March 14, 1933.　　J. A. YERKES ET AL　　1,901,217
INSERTED GUIDE AND BUMPER FOR BLIND CAGES
Filed Feb. 12, 1930　　2 Sheets-Sheet 1
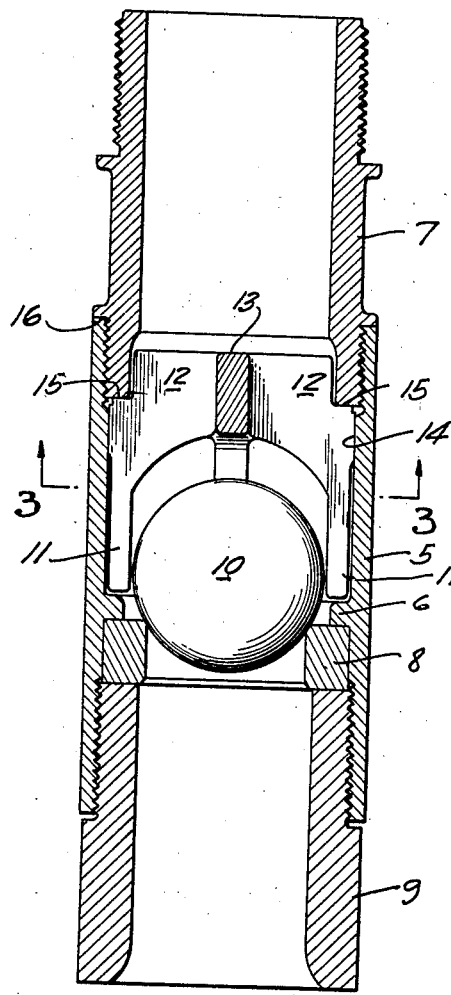
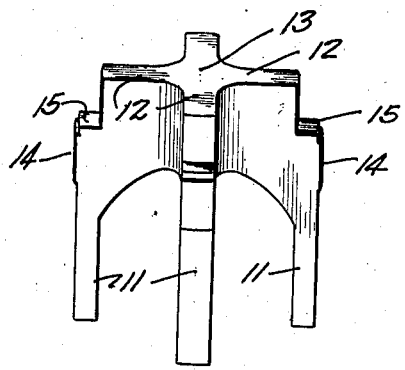
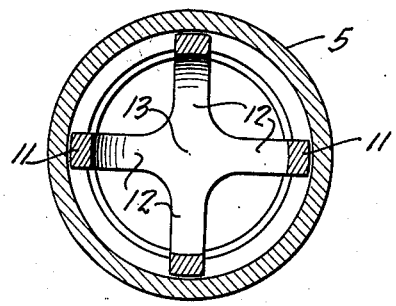
INVENTORS
John A. Yerkes
Rees H. Lemmon
BY Westall and Wallace
ATTORNEYS March 14, 1933.  J. A. YERKES ET AL  1,901,217
INSERTED GUIDE AND BUMPER FOR BLIND CAGES
Filed Feb. 12, 1930  2 Sheets-Sheet 2

INVENTORS
John A. Yerkes
BY Rees H. Lemmon
Westall and Wallace
ATTORNEYS

Patented Mar. 14, 1933 1,901,217

UNITED STATES PATENT OFFICE

JOHN A. YERKES AND REES H. LEMMON, OF LONG BEACH, CALIFORNIA

INSERTED GUIDE AND BUMPER FOR BLIND CAGES

Application filed February 12, 1930. Serial No. 427,979.

This invention relates to tubular valve cages in which fluid passes therethrough from end to end and appertains more especially to means for restraining the travel of a valve therein. Blind cages are specific types of such a valve structure and comprise tubular bodies having ball check valves therein in conjunction with or as part of valved piston deep well pumps. Such valves, if not restrained to a movement in line with the axes of their seats frequently damage both themselves and their seats. Unguided and unrestrained valves may strike only a portion of their seats resulting in the valve seats becoming imperfect as well as the valve and ultimately resulting in leakage. Blind cages have been provided with guide ribs on their peripheral wall to restrain the valve to movement in line with its seat. It is difficult to make an accurate casting of a blind cage including ribs integral therewith and it is also a difficult mechanical operation to machine such ribs after casting or to produce ribs by cutting away the material or stock of a body. Inserted guide pieces have been known in the art. It has been the practice to clamp such pieces tightly between the ends to prevent longitudinal movement, which may result from the ball valve hammering. Where the inserted member includes guide ribs, such longitudinal movement is obviously detrimental as the ribs are subject to wear and breakage. In practice, tight clamping such as described is not satisfactory. In oil well tubing the lateral space or cross sectional area is limited. Inaccuracies in threads, spacing of shoulders and the like are common both due to machining and setting up of parts. In inserted guide members, the ribs are small and weak. As a result ribs are often buckled with consequent impedance and even prevention of the movement of the ball. A tight fluid seal is necessary at joints and close seating of two joints on one pair of members is practically impossible. Furthermore, simultaneous clamping of a guide member and sealing of a joint without disturbance of guide rib alinement is practically impossible. If the guide member is not tightly clamped, the continuous pounding of the ball on the guide member causes upsetting of the adjoining metal parts between the guide member and tubing string. This results in increased longitudinal movement and greater hammering action until the guide member is further loosened. It is also current practice to provide a bumper bar above the valve travel to limit travel of the valve. Such bumper bars have sometimes been cast integral with the tubular cage and in other instances have been made detachable.

The present invention has for its principal object the provision of a novel guide rib unit insertable in a cage and overcoming the aforementioned disadvantages. Another object of this invention includes the provision of such a unit with a bumper bar. A further object of this invention includes details of construction of such a unit relating to the means for holding the unit in position in its cage.

We accomplish these objects by means of the embodiment of our invention illustrated in the accompanying drawings, in which:—

Figure 5:
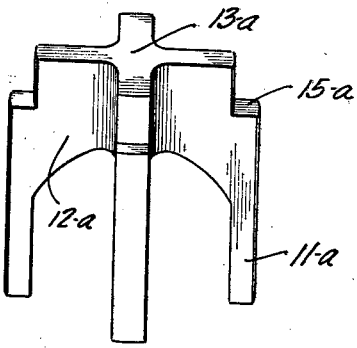

Fig. 1 is an axial section through a blind cage fitted with a detachable valve guide unit; Fig. 2 is a perspective view of the valve guide unit; Fig. 3 is a section as seen on the line 3—3 of Fig. 1; Fig. 4 is an axial section through another embodiment of our invention; and Fig. 5 is a perspective view of the guide shown in Fig. 4.

Referring more particularly to Figs. 1, 2 and 3, the tubular shell of a blind cage is indicated by 5, it being shown internally threaded at its upper and lower ends and provided with an intermediate stop shoulder 6. Threaded to the upper end of shell 5 is a coupling or bushing 7 by which it may be secured to the lower end of a pump plunger. A valve seat 8 of ring form is held against the under side of annular stop shoulder 6 by a sleeve 9 threaded into the lower end of the shell. This seat is insertable from the lower end of the cage and is clamped in position by the sleeve. A ball check 10 cooperating with the seat 8 controls the port opening therethrough. Within the bore of shell 5 is the guide rib unit.

The guide rib unit comprises ribs 11 joined at the top by wings 12 meeting at 13 so as to form a crown and bumper. At the point of merger of the ribs 11 with the wings, the outer periphery as indicated by 14 is of such diameter as to tightly fit within the bore of the cage. The fit is intended to be so tight that the unit must be pressed into the cage. It will be noted in the construction shown that there is a slight clearance between the ribs and the wall so that the ribs which are not rigid may flex slightly. Shoulders 15 are formed on the wings for engagement by the lower end of coupling 7.

In assembling the blind cage, the seat 8 is first inserted from the bottom into the shell 5 and then the sleeve 9 is screwed into position to clamp the seat in place. Next the ball check 10 is inserted through the top of the shell and the unit then slipped into position within the cage. Since the unit is a tight fit and must be pressed into place, it will not be initially inserted to its final position. Bushing 7 is screwed into the top of shell 5 and against the shoulders 15. By screwing up the coupling 7, the unit may be forced into its final position. It will be noted that the lower end of the ribs clear the shoulder 6 with the bushing 7 in its final position. This prevents pressure being exerted upon the ribs between the bushing and the shoulder 6 and consequent buckling or distortion of the guide ribs. Disassembly will be obvious to those skilled in the art. It will be noted that the unit is pressed tightly into the shell. In the event that the hammering and pounding action tends to drive the unit upwardly and imbed it in the bushing 7, the downward moving tendency would be effectively resisted by the gripping action of the tight fit with the shell. The hammering action is upward and the gravitative action of the unit together with fluid flow is downward. In the usual clamping methods, the unit is loose enough to drop. In accordance with our method, the downward drop is prevented so that the magnitude of impact between the unit and bushing is lessened. In practice at thirty strokes of the pump per minute, which is customary, the ball strikes the unit approximately forty-three thousand times per day. With such a rate it is obvious that short work would be made of the ribs especially at their lower ends. The press fit effectively prevents downward movement and impedes upward movement. A tight fluid seal is necessary at 16 and with our structure such seal may be obtained without risking buckling of the ribs or a loose fit longitudinally.

Referring to the structure shown in Figs. 4 and 5, a blind cage is marked 5a and has a stop shoulder 6a for a seat. The lower end of the cage has an internal thread to receive a sleeve 9a. A coupling or bushing 7a similar to coupling 7 shown in Fig. 1 is provided. It is provided initially with a shoulder 17 and has an end 18 which may be slipped into the bore of cage 5a. Instead of a screw connection the shoulder 17 is welded to the blind cage as indicated by 19. The lower end of the structure is formed in the manner of that shown in Fig. 1 with a valve seat 8a clamped between shoulder 6a and the sleeve 9a. The guide shown in Fig. 5 comprises ribs 11a joined by wings 12a to form a crown 13a, there being shoulders 15a for abutment by end 18 of the bushing. It will be noted however that the ribs 11a are not relieved at their outer sides but are engaged their entire length with the internal wall of the blind cage. A press fit is provided between the cage and guide. The ribs also extend from shoulder 6a to the end 18 of the bushing.

In the assemblage of the form of the invention shown in Figs. 4 and 5, the guide is pressed into position with the base of the ribs resting on shoulder 6a, the ball valve 10a being in the guide and cage. Bushing 7a is then inserted in the cage with end 18 abutting shoulders 15a. The bushing and cage are then welded together as indicated by 19. Obviously the guide is not replaceable as in the form of the invention first described. However, the guide has no compressive force exerted on the ribs, yet it is maintained between the bushing and shoulder 6a. As in the other type the press fit resists any tendency of the guide to be moved upwardly by impact of the ball against the crown and the further effect of the elevated liquid thereon. There is no looseness of fit such that the guide may be driven against the bushing. Longitudinal movement of the guide is highly undesirable. Referring to Fig. 1 where the members 5 and 7 are screwed together, it is imperative that these members shoulder tightly together at 16 to form a good fluid seal. It is very difficult in shop practice to simultaneously abut the guide unit at shoulders 6 and 15 to form a good fluid seal. For this reason it is necessary to make the guide somewhat shorter in length to clear the bottom shoulder and permit seating at 16. However, this leaves the possibility of some longitudinal play under severe conditions. By use of the welded slip fit connection between members 5a and 7a as shown in Fig. 4, the ribs are held against end play and at the same time a fluid tight seal is provided at joint 19. Thus, under severe conditions, if the guide unit is hammered against the shoulder 15a there is not sufficient play to permit damage.

Although we have shown and referred to a press fit between the guide unit and cage, it will be understood that this is a preferred construction. Any fit taking advantage of the tight lateral clasping of the unit by the cage may be used. This may be accomplished by taking advantage of the resilience of the metal, employing a tapered fit and sometimes making the receiving bore of slightly less diameter than the inserted member. The word clasp as herein used is intended to include such means as distinguished from means clamping between the ends.

What we claim is:—

1. In combination with a tubular valve cage for a check valve, an integral insertable valve guide unit initially of larger diameter than the bore of said valve cage positioned in the bore of said valve cage and having a press fit therewith to restrain it against downward movement therein, said guide unit including a plurality of axially extending ribs and an upper abutment in said cage to retain said unit against upward movement.

2. In combination with a tubular valve cage for a check valve having an internal stop shoulder, an integral insertable valve guide initially of larger outer diameter than the bore of said cage positioned in said bore and having a press fit therewith to restrain it against longitudinal movement therein, a bushing having an end disposed within said bore and engaging the valve guide at the top of the latter, said bushing being welded to said cage to form a leak tight joint, said guide including longitudinally extending guide ribs opposing said shoulder.

3. In combination with a tubular valve cage for a check valve having an internal stop shoulder, an integral insertable valve guide initially of larger outer diameter than the bore of said cage positioned in said bore and having a press fit therewith to restrain it against longitudinal movement therein, abutment shoulders at the top of said guide, a bushing having an end disposed within said bore and engaging the shoulders of said valve guide, said bushing being welded to said cage to form a leak tight joint, said guide including longitudinally extending ribs.

4. In a blind cage, the combination of a tubular shell having an annular shoulder, a seat below said shoulder, a sleeve threaded to said shell and clamping said seat against said shoulder, a valve guide unit positioned in the bore of said shell above said shoulder, said guide unit including axially extending ribs loosely fitting within the bore of said shell, wings joining said ribs to form a crown press fitted within the bore of said shell, a peripheral ledge on said wings and a tubular coupling threaded into said shell and engaging said ledge.

In witness that we claim the foregoing we have hereunto subscribed our names this 3rd day of February, 1930.

JOHN A. YERKES.
REES H. LEMMON.